United States Patent
Badal-Badalian et al.

(10) Patent No.: US 12,425,212 B2
(45) Date of Patent: Sep. 23, 2025

(54) SYSTEMS AND METHODS FOR SECURE DATA COMMUNICATIONS FOR STREAMLINED ELECTRONIC TRANSACTION PROCESSING

(71) Applicant: ROYAL BANK OF CANADA, Toronto (CA)

(72) Inventors: Arnold Badal-Badalian, Toronto (CA); Seung Bong Baek, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 150 days.

(21) Appl. No.: 18/385,867

(22) Filed: Oct. 31, 2023

(65) Prior Publication Data
US 2024/0146527 A1 May 2, 2024

Related U.S. Application Data

(60) Provisional application No. 63/421,168, filed on Oct. 31, 2022.

(51) Int. Cl.
*H04L 9/30* (2006.01)
*G06F 21/60* (2013.01)
*H04L 9/32* (2006.01)

(52) U.S. Cl.
CPC ............. *H04L 9/30* (2013.01); *G06F 21/606* (2013.01)

(58) Field of Classification Search
CPC ....... H04L 9/30; H04L 9/3226; H04L 9/3271; G06F 21/606
See application file for complete search history.

(56) References Cited

U.S. PATENT DOCUMENTS

| | | | | |
|---|---|---|---|---|
| 10,911,425 B1* | 2/2021 | Hitchcock | ............... | G06F 21/34 |
| 10,915,613 B2* | 2/2021 | Himabindu | ........... | H04L 9/3231 |
| 11,695,779 B2* | 7/2023 | Conkle | ................ | G06Q 20/389 726/9 |
| 2008/0040276 A1* | 2/2008 | Hammad | ........... | G06Q 20/3674 705/44 |
| 2011/0185406 A1* | 7/2011 | Hirson | ................ | H04W 12/068 726/5 |
| 2012/0226582 A1* | 9/2012 | Hammad | ............. | G06Q 20/425 705/35 |
| 2012/0240204 A1* | 9/2012 | Bhatnagar | .................. | H04L 9/32 726/5 |
| 2013/0139222 A1* | 5/2013 | Kirillin | ................... | H04L 67/02 726/4 |
| 2016/0180072 A1* | 6/2016 | Ligatti | ..................... | G06F 21/40 726/7 |
| 2016/0197914 A1* | 7/2016 | Oberheide | .......... | H04L 63/0853 713/183 |

(Continued)

*Primary Examiner* — Darren B Schwartz
(74) *Attorney, Agent, or Firm* — Norton Rose Fulbright Canada LLP (57) ABSTRACT

A system for secure data communications for streamlined electronic transaction processing is described in some embodiments that is adapted to adaptively handle a new transaction request from a user from a portable device through a web interface, which may be accessed, for example, through a web browser or through a mobile application residing on the user's portable device. The adaptation can include a dynamically set device binding and/or fingerprint data payload, which can be automatically updated in certain situations to account for feature drift, avoiding issues associated with stale bindings.

20 Claims, 10 Drawing Sheets

(56) References Cited

U.S. PATENT DOCUMENTS

| | | | |
|---|---|---|---|
| 2016/0307194 A1* | 10/2016 | Bhatnagar | H04L 63/0838 |
| 2017/0094510 A1* | 3/2017 | Khosravi | H04L 63/04 |
| 2017/0126672 A1* | 5/2017 | Jang | H04L 63/0492 |
| 2017/0149840 A1* | 5/2017 | Zhang | G06Q 20/108 |
| 2017/0364911 A1* | 12/2017 | Landrok | G06Q 20/385 |
| 2018/0295514 A1* | 10/2018 | Brown | H04W 12/069 |
| 2019/0281053 A1* | 9/2019 | Brown | H04W 12/06 |
| 2021/0019756 A1* | 1/2021 | Rule | H04W 4/80 |
| 2021/0029111 A1* | 1/2021 | Mossler | H04L 63/083 |
| 2022/0022039 A1* | 1/2022 | Oberheide | H04L 63/0853 |
| 2023/0155812 A1* | 5/2023 | Bennison | H04L 9/0861 |
| | | | 713/171 |

* cited by examiner

SYSTEMS AND METHODS FOR SECURE DATA COMMUNICATIONS FOR STREAMLINED ELECTRONIC TRANSACTION PROCESSING

CROSS REFERENCE

This application is a non-provisional of, and claims all benefit, including priority to U.S. Application No. 63/421,168, filed on Oct. 31, 2022, entitled SYSTEMS AND METHODS FOR SECURE DATA COMMUNICATIONS FOR STREAMLINED ELECTRONIC TRANSACTION PROCESSING.

This document is incorporated herein by reference in its entirety.

FIELD

Embodiments of the present disclosure generally relate to the field of data communications, and more specifically, embodiments relate to devices, systems and methods for secure data communications for streamlined electronic transaction processing.

INTRODUCTION

A challenge with web-based interfaces is that transitioning between different interfaces when conducting electronic payments can cause compatibility issues from a technical web interface perspective or a challenging user experience whereby the user interface incorporates elements from different user experiences (e.g., a merchant and a financial institution).

This is especially prevalent in respect of merchant web portals/web sites, where a user traversing merchant webpages desires to provide payment for a product or a service. While the user is able to simply provide credit card information in the form of inputs into text fields, additional security pages can have different user interfaces and unfamiliar UI elements.

These different user experiences can be caused by differences in presentation of rendered elements (e.g., different cascading style sheets), which impacts content accessibility and trust by a user.

SUMMARY

A system for secure data communications for streamlined electronic transaction processing is described in some embodiments that is adapted to adaptively handle a new transaction request from a user from a portable device through a web interface, which may be accessed, for example, through a web browser or through a mobile application residing on the user's portable device. The system provides a hybrid "pay by bank" mechanism where the transaction request is coupled with automatic "step up" capabilities where identified by a real time decision engine. The system interfaces through the existing web interface such that a user is not required to traverse a multitude of different interfaces in the payment process flow in, for example, a merchant's web interface, reducing user experience friction, at various areas of increased security.

An improved computational binding process is described in various embodiments herein. In particular, the computational binding process includes several computational steps that are utilized to establish a secure data binding payload that can be used as a mechanism for later generation or establishing of secure communication channels. The secure data binding payload is a point-in-time generated data payload, and variant approaches are also thus contemplated in respect of utilizing dynamic approaches for dynamically updating the secure data binding payload periodically, for example, in combination with various interactions, such that stale bindings can be updated, etc. This is a particularly helpful approach as it relates to practical use cases, as a person is more likely to make minor incremental changes to their behavior/device characteristics, and an important consideration is to adapt to these small deviations over time to avoid unnecessarily raising "step up" authentication capabilities.

By updating a secure data binding payload or a corresponding fingerprint over time, the computational "distance" between what is stored on the secure data binding payload or the corresponding fingerprint can be incrementally updated so that when a new authorization is requested, the secure data binding payload or a corresponding fingerprint is closer to what the person is actually using at a particular point in time, reducing the propensity of false positives, etc., while still having the ability to account for true negatives, etc. For example, a user may upgrade a smartphone to a next version or next generation, and simply restore a backup of the previous smartphone onto the new device. In doing so, the fingerprint field associated with the device model can change, but many other elements remain roughly the same—number of applications, number of focus profiles, etc. At a next interaction using the new device, depending on a threshold for a step up re-authentication, a step-up authentication might be requested, but even if it is not, there is an opportunity for the system to update its profiles. In some embodiments, at this point in time, the previous binding and/or fingerprint data payloads are seamless updated behind the scenes to take into account the new information. Accordingly, at a subsequent usage, the updated device model will not contribute to a deviation score.

A further variation is described in respect of a data object that is stored in respect of a clustering approach relating to dynamic fraud detection based on the near-ness of historical purchases (e.g., based on related SKUs). Related items may have reduced propensity of fraud, and these may be tracked, for example, in a graph data structure or a directed graph data object based on historical purchases by a cross-section or distribution of other users. In a specific example, a person may have purchased a product such as a pencil that requires certain consumables, such erasers.

A graph data object can be consulted based on the clustering approaches to identify a relationship of erasers to the pencil, and based on these relationships, a threshold can be reduced relative to the purchase of the erasers, such that either a step up authentication is suppressed for similar products, or is less likely to occur with similar products. The use of a reference graph data object based on a distribution of historical purchases by other users is a useful approach that does not require explicit programming or rules. For example, it can be used to identify emergent behavior or relationships, such as those between seemingly non-related purchases, such as purchasing Jamaican beef patties at a particular vendor and using a related transit gate of a transit station. While the SKUs would not otherwise be related in the normal course of transactions, an emergent relationship is present in this particular situation because this vendor is particularly famous for the taste of their beef patties, and thus the system could automatically identify this relationship through the usage of the graph data object.

During an initial set up process, the portable device is bound to a backend computing system through the communication of a data elements between the devices and the computing system. The data elements are encapsulated in the form of device binding data object storing one or more data fields representative of characteristics of the portable device that are received at the backend from the portable device associated with a user, a device binding data object storing one or more data fields representative of characteristics of the portable device. The user's device uses a web interface and attempts to access it, and a transaction request is provided including at least a transaction card number.

The backend computing device then retrieves, based on a cross-referencing of the transaction card number with unique communication identifier strings stored on the data storage, a corresponding unique communication identifier string; and controls the portable device to render a first challenge interface screen utilizing at least the corresponding unique communication identifier string.

Upon receiving a successful response input from the portable device to the first challenge interface screen, the backend computing device processes, the transaction request using a real-time decision engine configured to automatically determine whether a step-up authentication data process should be invoked based at least on the one or more fields of the device binding data object.

Upon a determination that the step-up authentication data process should be invoked, the system transmits a secure code across a second communication pathway utilizing the unique communication identifier string to the portable device; the backend computing device controls the portable device to render a second challenge interface screen requesting entry of the secure code into the second challenge interface screen; and upon an entry of the secure code into the second challenge interface screen, the system authenticates the transaction request for downstream processing.

The determination that the step-up authentication data process should be invoked can be based on a deviation score based on an analysis of the one or more fields of the device binding data object or a corresponding fingerprint data object (if the fingerprint data object is not a payload of the device binding data object). The deviation score can also take into account other factors, such as a routing details of a particular type of payment mechanism (e.g., BIN routing), and other logical rules that are set as system modifiers. The deviation score can thus be generated based on a computational distance as between information tracked during the transaction, and a sufficient deviation score for triggering a step up authentication workflow can change depending on details of a particular transaction, such as various fraud rules, etc. As noted above, there may also be automatic approaches for suppressing or reducing the total amount of step up authentications for similar or related products, for example, as identified by querying a graph data object.

A challenge with these determinations is the need to be able to conduct them expeditiously in response to purchase attempts. While for large purchases, a slower processing may be acceptable, it becomes an increased inconvenience for smaller purchases, and thus an important computing factor for consideration is the speed in which a determination may be made.

Corresponding systems, methods, and computer program products, including non-transitory computer readable media, are proposed herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

A system for secure data communications for streamlined electronic transaction processing is described in some embodiments that is adapted to adaptively handle a new transaction request from a user from a portable device through a web interface, which may be accessed, for example, through a web browser or through a mobile application residing on the user's portable device.

The system provides a hybrid "pay by bank" mechanism where the transaction request is coupled with automatic "step up" capabilities where identified by a real time decision engine. The system interfaces through the existing web interface such that a user is not required to traverse a multitude of different interfaces in the payment process flow in, for example, a merchant's web interface, reducing user experience friction, at various areas of increased security.

Figure 1:
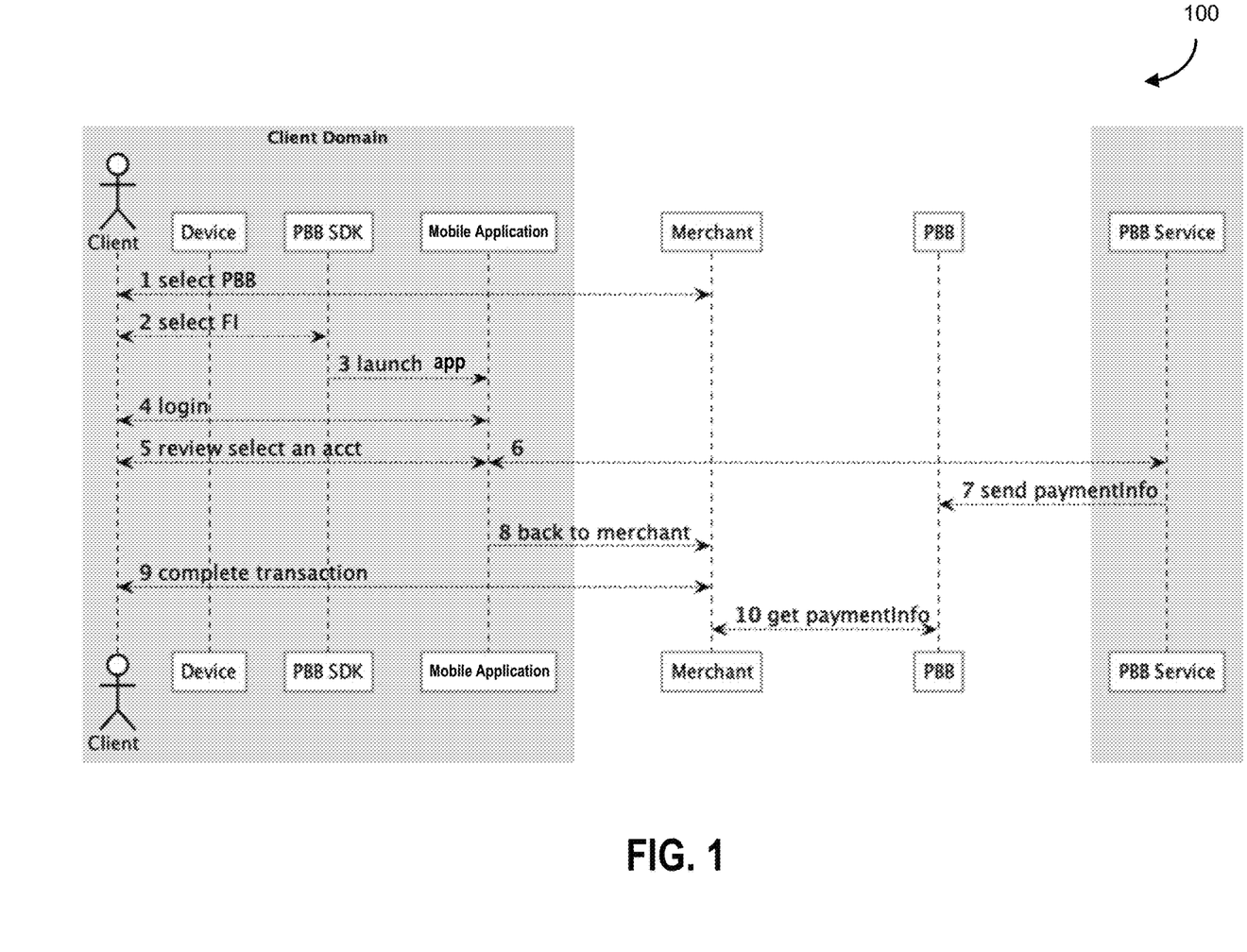
FIG. 1 is a workflow diagram showing an example method for a payment transaction.

FIG. 1 is a workflow diagram showing an example method 100 for a payment transaction. In this example, a user is seeking to access the pay by bank mechanism, which, can be pre-set up using a online banking website or mobile banking application, or in line with a purchase transaction checkout workflow, which can be used to launch an online mobile banking application where a user is able to choose an account through their online banking application to bind for a particular checkout process. This set up checkout can be conducted for a one-time transaction or a recurring transaction, and as part of the process, the mobile banking application can expose a set of services through a software development kit (SDK) for controlling computer interactions between the client's device, a merchant, and a backend financial institution computing service that handles and approves transactions.

Figure 2:
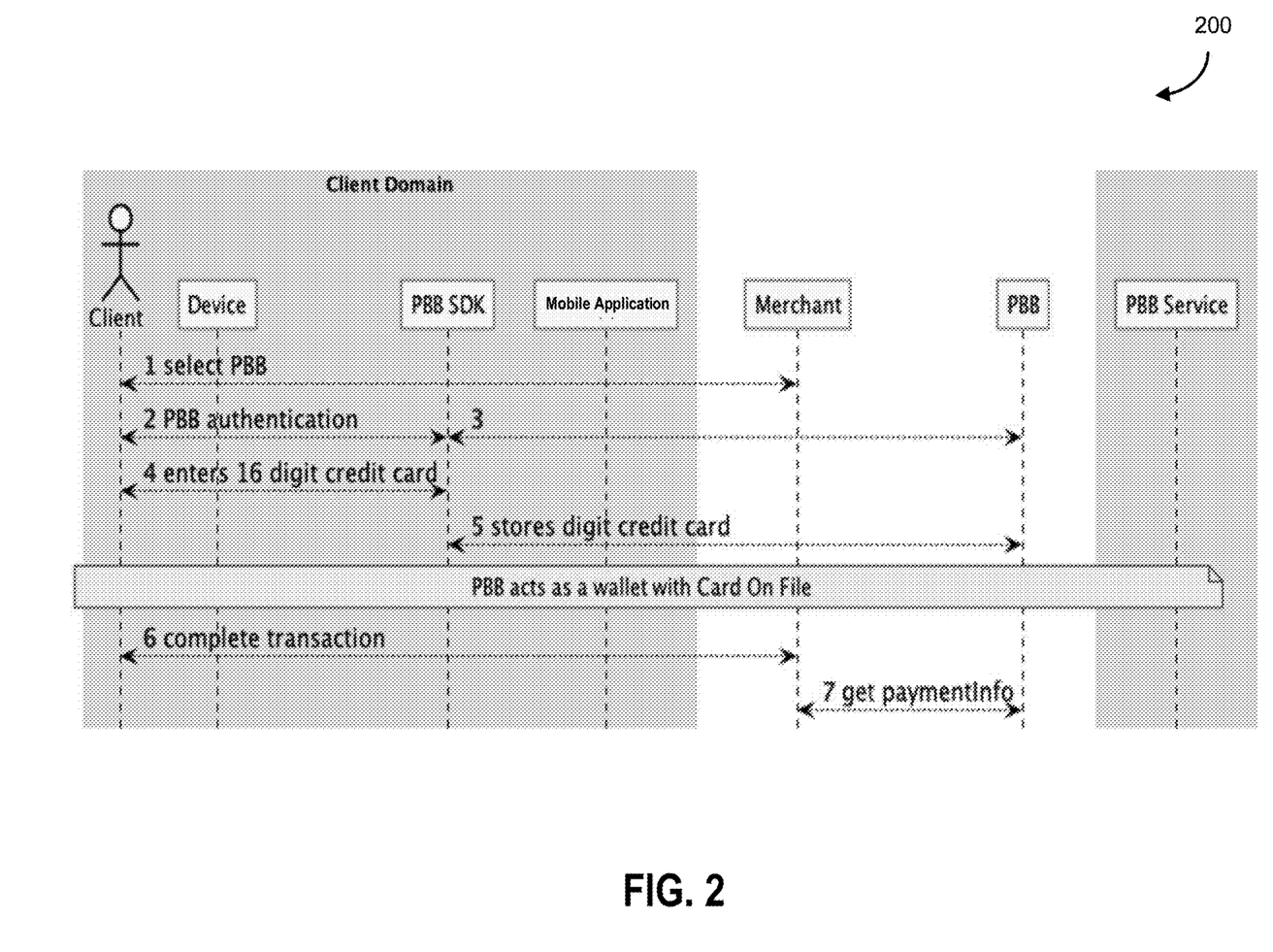
FIG. 2 is a workflow diagram showing an example method for a payment transaction, according to some embodiments. In this improved version, a token mechanism is utilized as a wallet with card on file.

FIG. 2 is a workflow diagram showing an example method 200 for a payment transaction, according to some embodiments. In this improved version, a token mechanism is utilized as a wallet with card on file.

During an initial set up process, the portable device is bound to a backend computing system through the communication of a data elements between the devices and the computing system. The data elements are encapsulated in the form of device binding data object storing one or more data fields representative of characteristics of the portable device that are received at the backend from the portable device associated with a user, a device binding data object storing one or more data fields representative of characteristics of the portable device. The user's device uses a web interface and attempts to access it, and a transaction request is provided including at least a transaction card number.

The backend computing device then retrieves, based on a cross-referencing of the transaction card number with unique communication identifier strings stored on the data storage, a corresponding unique communication identifier string; and controls the portable device to render a first challenge interface screen utilizing at least the corresponding unique communication identifier string.

Upon receiving a successful response input from the portable device to the first challenge interface screen, the backend computing device processes, the transaction request using a real-time decision engine configured to automatically determine whether a step-up authentication data process should be invoked based at least on the one or more fields of the device binding data object.

In this example, while the payment object could appear to be similar to a wallet object as a "card on file", additional computational measures and data objects can be established by the mobile application during the set up process. In particular, as described further below in various embodiments, the approach may include setting up additional security elements that during a seamless set up period that can include fingerprint data payloads that can include encrypted dimensional fields relating to certain information available to the mobile application at the time of initial binding. These can be stored in a data object, such as a linked list or data array of values, and in some embodiments, an element of noise or variance can be injected into the values during initial tracking to provide an improved level of security. In some embodiments, a separate encrypted fingerprint data payload may instead be stored at a backend computing server, such as a financial institution server used for verification, accessible via a secure pointer or linker from a binding data object. This separate approach is useful for situations where the file size of the binding data object is limited and there may not be sufficient storage for all of the useful fields of the point-in-time device fingerprint.

This can be initialized using an approach where someone can indicate that they would like to have the approach "remember this device", such as using a check box. However, instead of simplistic approaches, when the device is remembered, it is instead represented in the form of an improved binding data object with a binding payload.

During this process, additional security steps may be required by the user to enhance the security of the binding payload. For example, additional verification steps, including the use of personal verification questions, one-time time based passcodes may be utilized, a physical token, etc., which can be used as additional "out of band" type security measures to enhance an overall security level for the initial point-in-time binding. These out of band additional security measures can be helpful in ensuring that downstream the binding data object can be trusted for future usage, especially as it is updated over time in view of expected deviations and 'staleness', for example, as the binding data object migrates from device to device, is subject to operating system upgrades, among others.

Effectively, the data binding payload acts as a hidden "multi-factor" authentication mechanism that is utilized in conjunction with future purchases to help improve fraud detection and prevention, but while without always requiring the user to take additional user interface steps to provide more information. As noted herein, a challenge with these types of mechanisms is that over time, the usefulness starts becoming limited as the binding becomes stale and the information "drifts" away from the original point-in-time binding.

Figure 3:
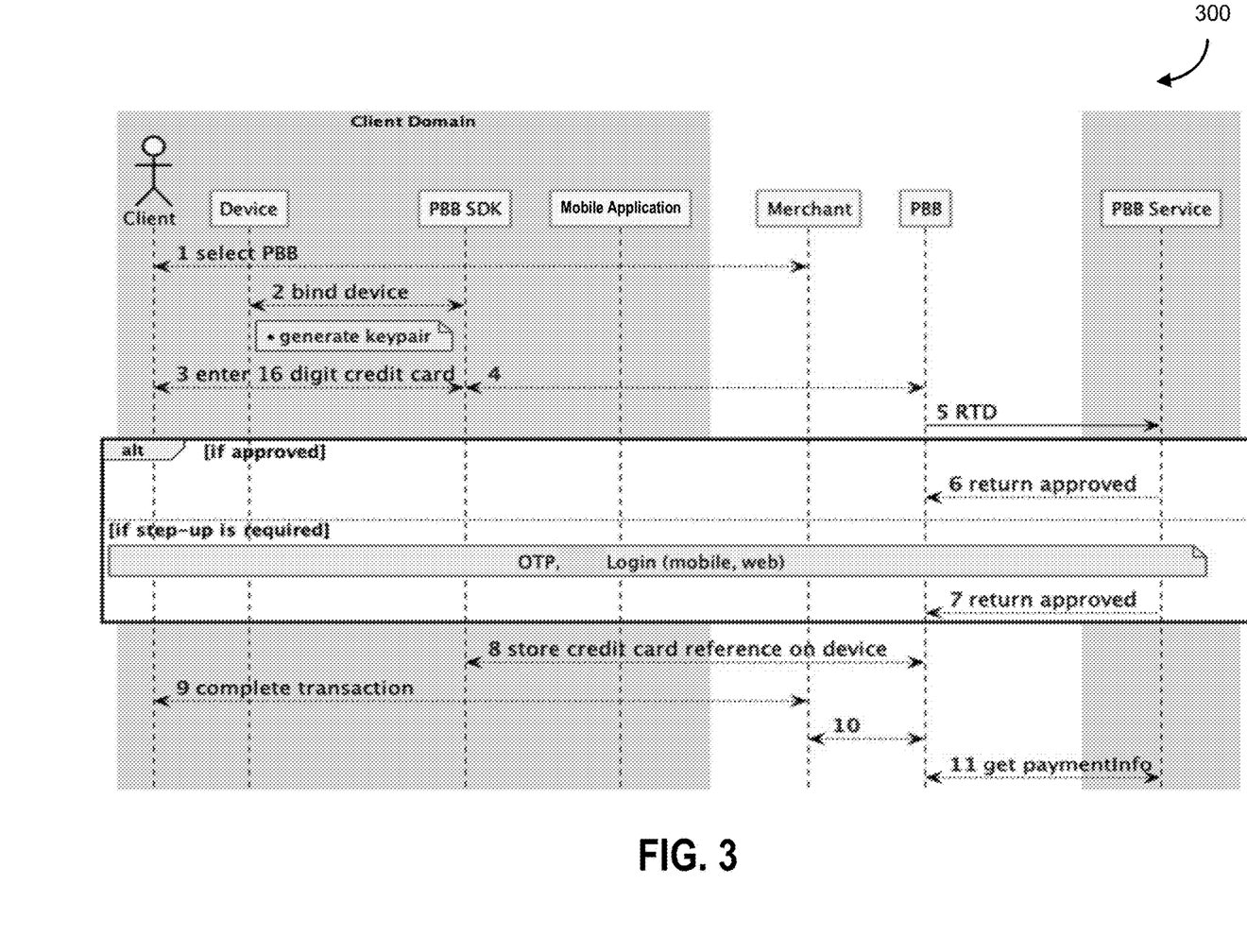
FIG. 3 is a workflow diagram showing an example method for a payment transaction, according to some embodiments. An example binding approach is shown utilizing a keypair for an initial use.

FIG. 3 is a workflow diagram showing an example method for a payment transaction, according to some embodiments. An example binding approach is shown utilizing a keypair for an initial use. In this variation, the binding approach is done through an initial payment selection, and in some embodiments, Upon a determination that the step-up authentication data process should be invoked, the system transmits a secure code across a second communication pathway utilizing the unique communication identifier string to the portable device; the backend computing device controls the portable device to render a second challenge interface screen requesting entry of the secure code into the second challenge interface screen; and upon an entry of the secure code into the second challenge interface screen, authenticates the transaction request for downstream processing.

In the initial use, a step-up can be utilized and established to transform the device binding. If a step up is required, the step up can take into consideration the binding process and a potential deviation from the original binding data object (e.g., how many features have deviated, with different weights associated to arrive at a weighted average deviation). A normalized deviation score can then be utilized to determine whether a step up is required, or what kind of step up. For example, a minor step up could include asking for a CAPTCHA to be completed, a one-time passcode, or selecting a phone number, while a more major step up could include answering personal verification questions, responding to an email, or answering a phone call.

Figure 4:
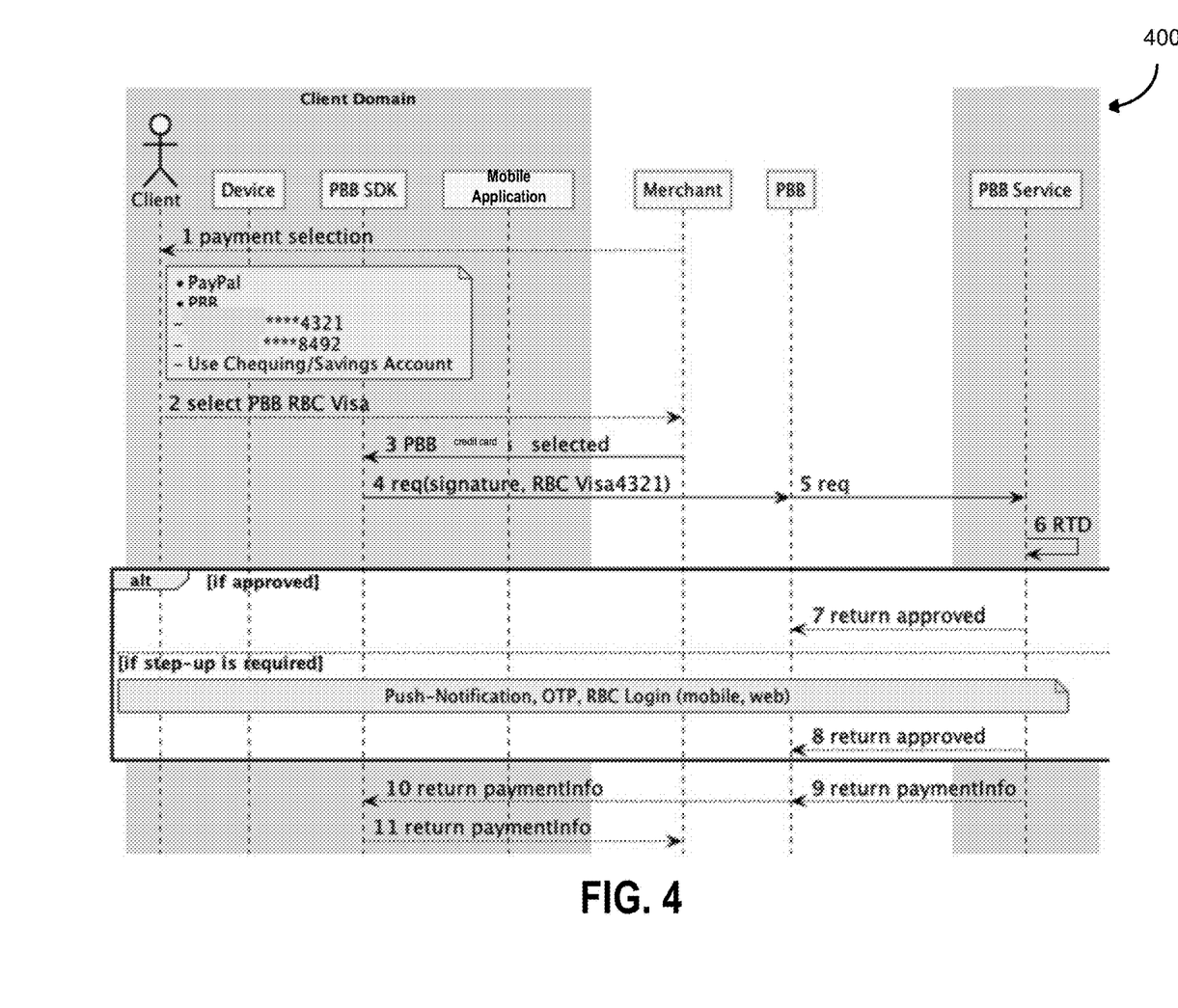
FIG. 4 is a workflow diagram showing an example method for a payment transaction, according to some embodiments. An example binding approach is shown utilizing a keypair for a subsequent use.

FIG. 4 is a workflow diagram showing an example method 400 for a payment transaction, according to some embodiments. An example binding approach is shown utilizing a keypair for a subsequent use. For the subsequent usage, the earlier step-up can be used as an input into the determination of whether the step up is required.

A binding device keypair and other payloads can be established at this point in time. The mobile application can be instructed to harvest details of the device based on conducting a query of various types of information available to the application, and these can include device model numbers, a number of applications installed, and even other information such as an angle of holding the device, or a volume level setting, etc.

As described later in variations herein, this binding may represent a point-in-form identification of the device through the mobile application's available functionality, and this can become stale over time and thus in some variations, this binding device payload can be updated over time in an attempt to seamlessly update the binding in accordance with incremental changes in user devices, behavior, among others.

Figure 5:
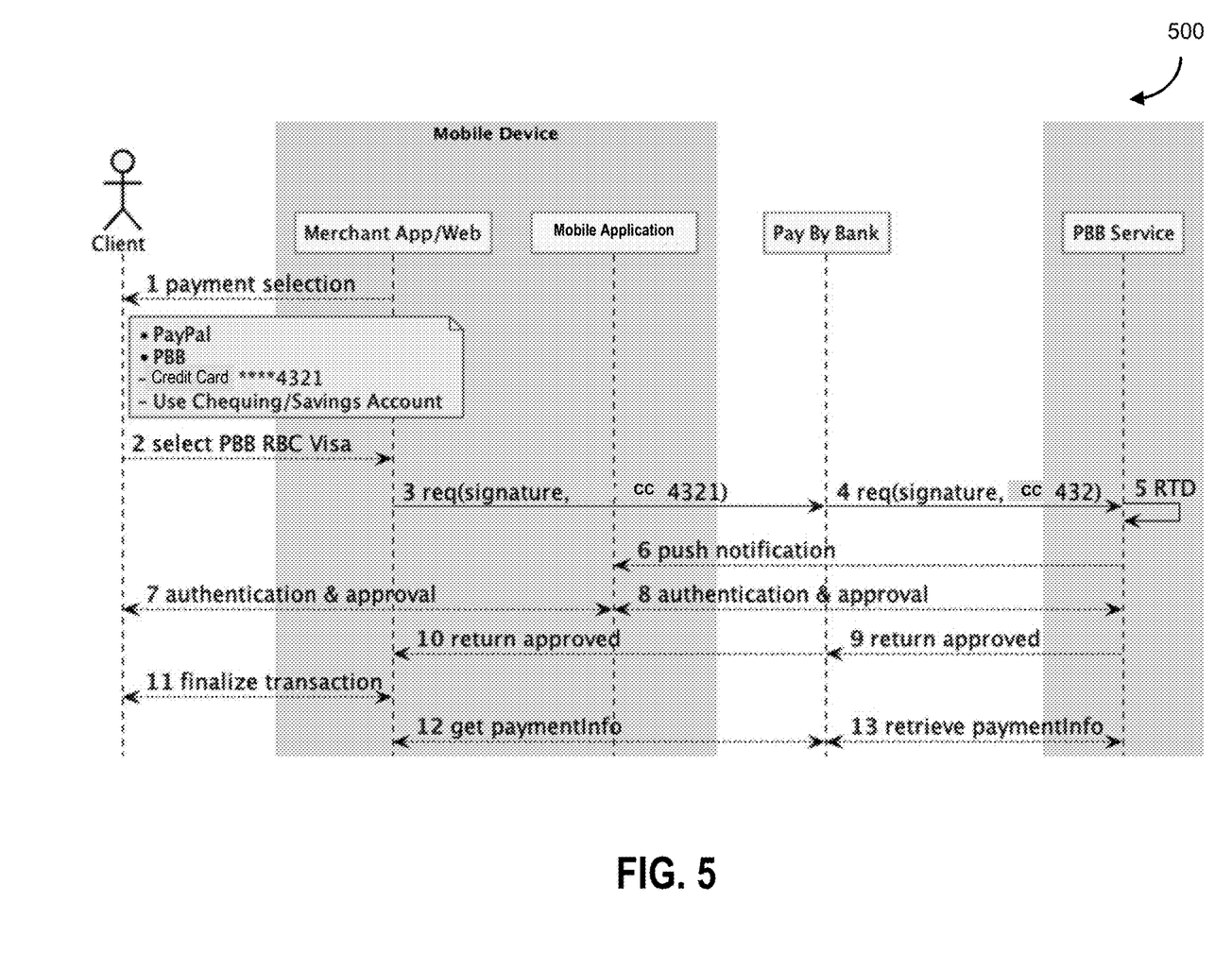
FIG. 5 is a workflow diagram showing an example method for a payment transaction, according to some embodiments. An example binding approach is shown utilizing a keypair for a subsequent use with push notification.
Figure 6:
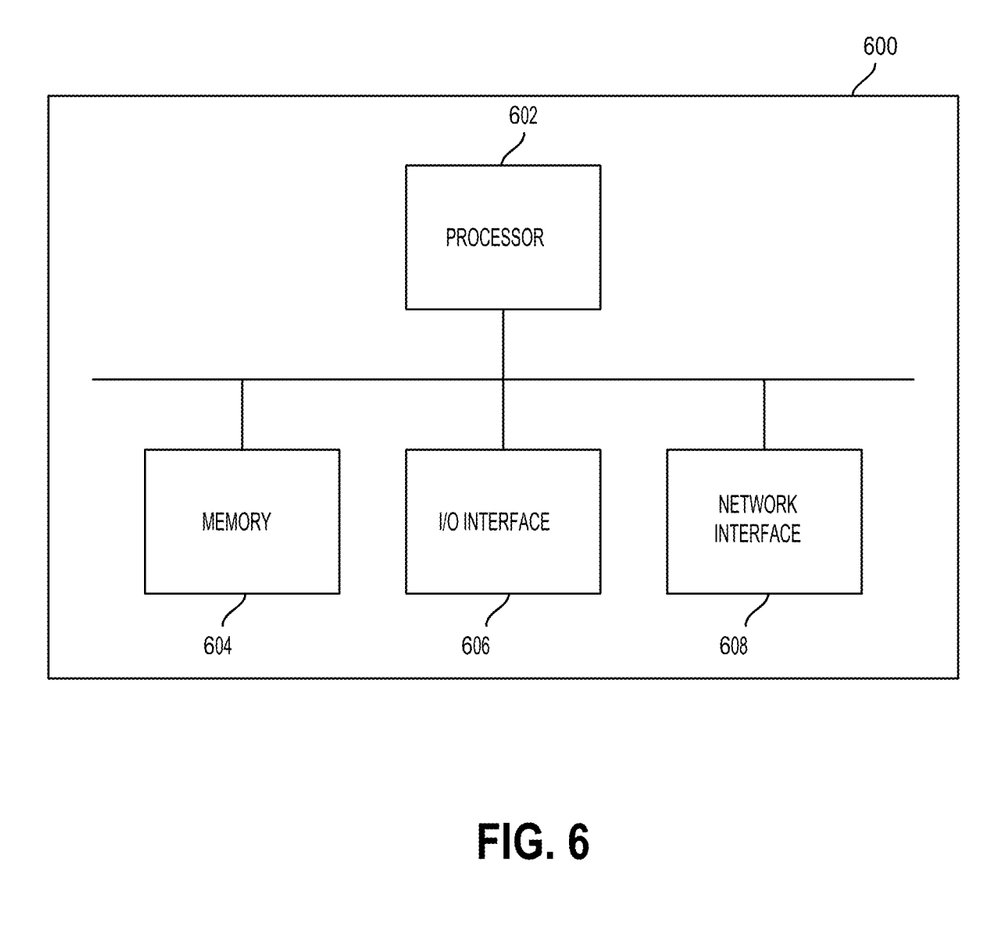
FIG. 6 is an example system diagram showing an example system for conducting a payment transaction, according to some embodiments.

FIG. 5 is a workflow diagram showing an example method 500 for a payment transaction, according to some embodiments. An example binding approach is shown utilizing a keypair for a subsequent use with push notification. In this example, a push notification can be utilized as a mechanism for obtaining an alternative authentication and approval. The push notification can be used to require the user to return an approval, such as using a biometric such as a fingerprint or a face scan, among others. The push notification can be considered as a step up approach that can be determined for use dynamically based on a weighted deviation score, and as noted herein, each subsequent push notification and response and update may provide an opportunity to account for a drift or staleness in a device binding, such that an incrementally small drift or change could, instead of, or in addition to, requiring a step up, can be used for FIG. 6 is a schematic diagram of a computing device 600 such as a server for conducting a payment transaction. As depicted, the computing device includes at least one processor 602, memory 606, at least one I/O interface 606, and at least one network interface 608.

Processor 602 may be an Intel or AMD x86 or x64, PowerPC, ARM processor, or the like. Memory 604 may include a combination of computer memory that is located either internally or externally such as, for example, random-access memory (RAM), read-only memory (ROM), compact disc read-only memory (CDROM).

Each I/O interface 606 enables computing device 600 to interconnect with one or more input devices, such as a keyboard, mouse, camera, touch screen and a microphone, or with one or more output devices such as a display screen and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Computing device 600 is operable to register and authenticate users (using a login, unique identifier, and password for example) prior to providing access to applications, a local network, network resources, other networks and network security devices. Computing devices 600 may serve one user or multiple users.

Figure 7:
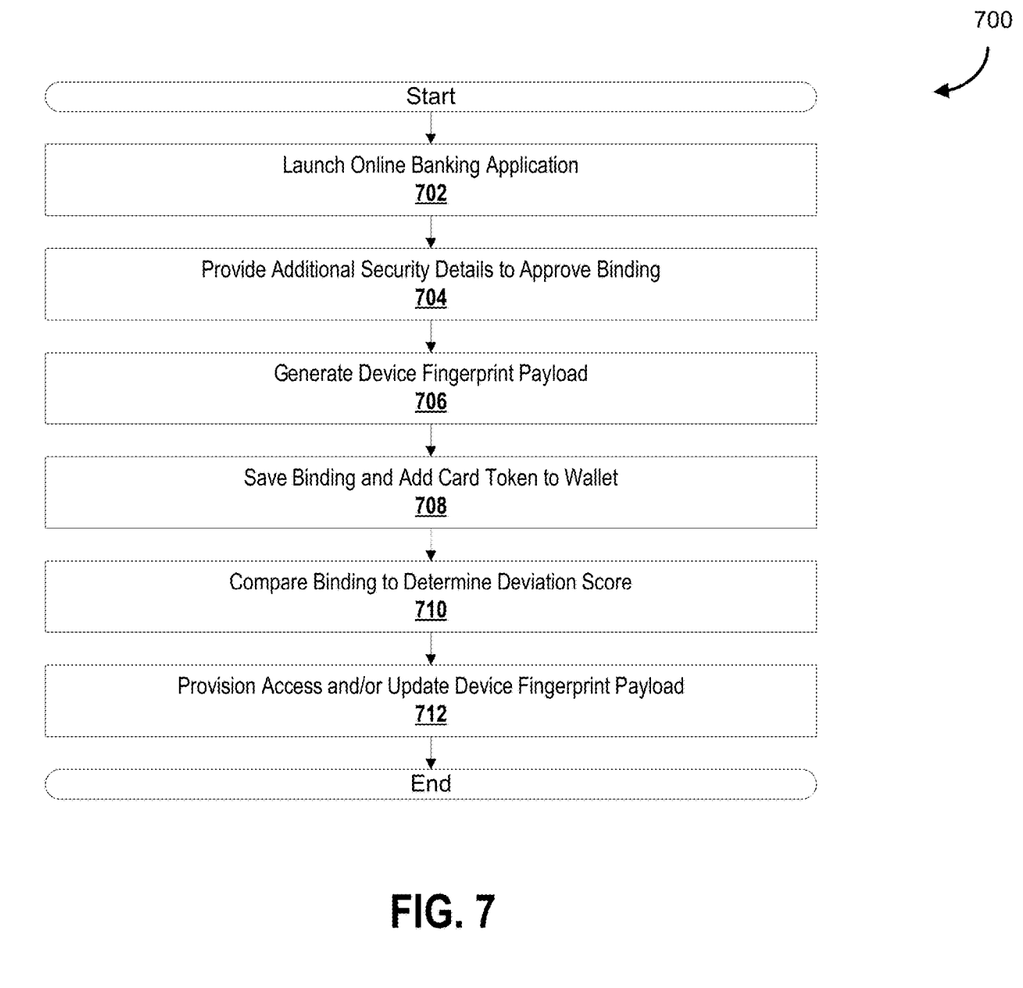
FIG. 7 is an example workflow diagram showing an example method for device binding, according to some embodiments.

FIG. 7 is an example workflow diagram showing an example method 700 for device binding, according to some embodiments. In FIG. 7, a number of steps are shown where initially, the online banking mobile application is launched at 702. This can occur through a user selecting the application to open to add a card to a wallet, but can also occur as invoked during a payment flow, for example, through a corresponding computational "hook" where a universal link or deep link is used along with a payload to cause the opening of the online banking mobile application. Optionally, to start the binding process, additional information may be requested at 704, and this additional information may include a baseline step up verification that occurs for enhanced security. In some embodiments, the baseline step up verification includes requesting information that will be utilized as part of the binding process as an additional field.

At 706, a secure data binding payload is established that can be used as a mechanism for later generation or establishing of secure communication channels. During the initial binding process, the device binding can include, for example, generating a signature binding data object (or hashed versions of the information) that, in some embodiments, can be based on existing characteristics of the interaction, the user's device, the specific computer devices being interacted with among others.

The device binding can be captured as a fingerprint, and this, in some embodiments, can be a plaintext file of one or more of the above features, or can be an encrypted, hashed, or otherwise encoded file of the above features. A benefit of using certain types of encoding (as opposed to hashing) is that measurements can be tracked against individual elements for determining variations and a level of variance.

This binding is encapsulated ultimately using a specialized keypair data object established between the device and the merchant. The keypair data object, in some embodiments, can include the fingerprint data object as a payload, or in other variations, can be used to unlock a stored fingerprint data object for processing (as opposed to transporting it as a payload).

The secure data binding payload is a point-in-time generated data payload, and variant approaches are also thus contemplated in respect of utilizing dynamic approaches for dynamically updating the secure data binding payload periodically, for example, in combination with various interactions, such that stale bindings can be updated, etc.

At 708, the binding is saved, and on local storage, a binding payload and/or a fingerprint payload can be saved. In some embodiments, the binding payload and/or the fingerprint payload can be associated with a timestamp data value, which can be used in the future to determine a drift/staleness value that is used to determine whether an automatic future update is required.

At 710, at a future time, during a subsequent purchase or desired transaction flow, the binding is invoked when the user attempts to use the particular card or a particular token associated with the card. The binding acts as an automatic two-factor authentication against device characteristics, and at this time, the binding (binding payload and/or fingerprint payload) is compared against contemporaneous data associated with the payment transaction to determine a deviation score. The deviation score can be a weighted average of the differences between different values of different fields, and these can have different magnitudes assigned based on how different a field can be.

A risk tolerance level can be pre-defined in a purchase transaction, or set based on different quanta, such as high, medium, or low risk transactions. Fraud statistics can be used to automatically assign risk levels to different transactions. For example, cryptocurrency, large denomination, very fungible items or their corresponding categories can be automatically flagged as high risk, while low value items, commonly bought items, etc., can be assigned as low risk items. As noted in a further section below, the risk categorization of an item can also vary dynamically in certain circumstances, according to a variant embodiment.

If the risk tolerance level is greater than the deviation score, for example, access can be provisioned. In a further embodiment, if the deviation score is lower than a threshold drift threshold deviation score, and for example, the fingerprint is flagged as stale or having a pattern of drift, an automatic updating of the device fingerprint and/or re-binding can occur. In some embodiments, this updating may automatically trigger another step up authentication. In other embodiments, this updating occurs seamlessly to the user behind the scenes (e.g., a new fingerprint is taken at this point-in-time, and it replaces the previous binding's payload).

Figure 8:
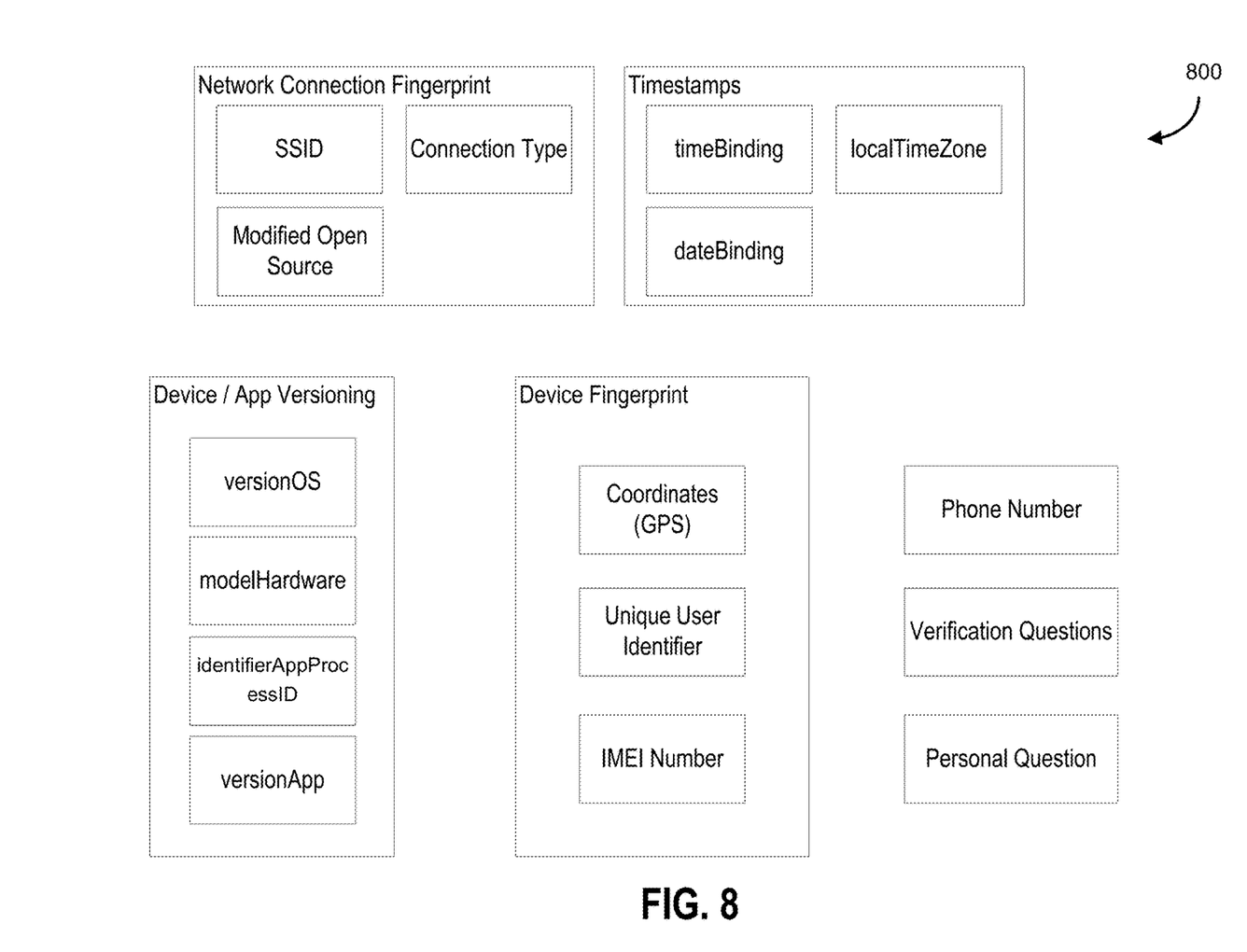
FIG. 8 is an example data structure diagram showing an example device binding data object, according to some embodiments.

FIG. 8 is an example data structure diagram 800 showing an example device binding data object, according to some embodiments.

In a non-limiting example, the device binding can be based on the following data variables set up at the time of binding in FIG. 3. These can include, for example:

coordinatesDeviceLocation; identifierUUID; versionOS; model Hardware; identifierAppProcessID; identifierAppParent_Process; dateBinding; timeBinding; identifierTimeZone; installedApps; processorType; phoneBrightness; appBitCode; etc.

Additional data variables can include characteristics of the networked communication, such as:

typePacket; addressInternetProtocol; identiferSSID; among others.

Each of these can be turned into a specific feature, which is stored as an array of fields. In some embodiments, some of the features are converted into numerical values, while in others, the features are converted using a hash or other type of mechanism to ensure privacy. In another variation, the features can simply be stored plaintext and then encrypted using a trusted execution engine and a corresponding encryption key. In some embodiments, the smartphone itself stores a trusted execution engine that can be used for generating deviation scores without underlying access. In another embodiment, the merchant webpage can connect either to a local instance of a trusted execution engine or a third party trusted execution engine that has access to the corresponding encryption key for generating the deviation scores.

In a simplified example, a device binding payload/fingerprint payload may include the following:

portions, while other portions have stayed the same). This overall difference amount, for example, can be weighted based on identified and positively/negatively identified threat/fraud samples, and can be used against a step up authentication threshold. The step up authentication threshold can also be varied based on backend logical rules, such as a transaction size, a transaction sensitivity score (e.g., certain retailers or SKU items are more prone to theft, such as gift cards), a channel type (e.g., certain channels are more prone to theft/fraud).

The step up authentication can trigger an additional challenge approach, such as a one-time-password/passcode (OTP), and can be implemented in the form of a push notification.

Figure 9:
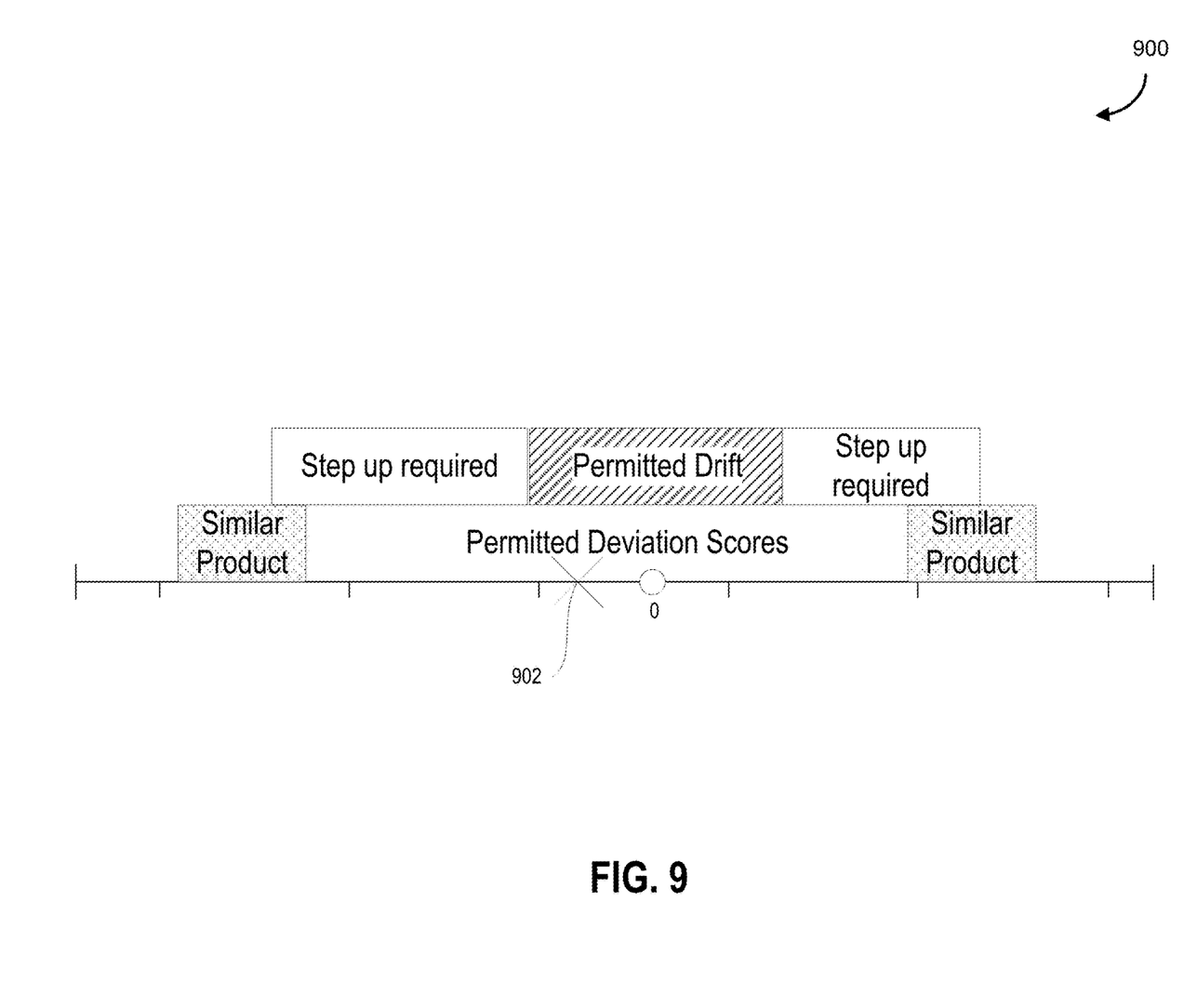
FIG. 9 is a graph showing ranges of permitted deviation scores, according to some embodiments.

FIG. 9 is a graph 900 showing ranges of permitted deviation scores, according to some embodiments.

In operation, the bindings and the above data objects can be used in a dynamic approach set through logical rules and processing rules at a merchant or a backend "pay by financial institution service". In particular, the fingerprint, once unlocked using the binding keypair, can be used to provide dynamic decisioning where different "step up" authentication interfaces can be invoked depending on a particular use case of a transaction.

These are shown in FIG. 9, where, the score ended up being shown in the X at 902. In this example, the binding was compared against the contemporaneous values to arrive at the deviation score, and a number of different ranges are provided. When the value lands in the "permitted drift" range, in addition to using the binding to provide secured access, the binding, if stale (e.g., if the time elapsed is past a certain duration), the binding is automatically generated and updated. For example, the binding at T=0 is replaced by the binding at T=25 days. This is useful so that the binding automatically shifts and updates over time as regular usages and changes occur, such as the number of apps installed, the model number changes upwards, the operating system version changes, etc. Accordingly, an automatic re-binding process (fingerprint generation process) can automatically be invoked without the user being aware of it, and the previous binding is replaced.

The size of the permitted deviation scores can be based on a threat model, such as a threat decision matrix data object that is provided or utilized by a transaction backend. For

| Description | Weight | Fingerprint Value | Contemporaneous Value | Deviation Score (Normalized) |
|---|---|---|---|---|
| Location | 1 | −10.474895, 105.616257 | −10.574895, 107.616257 | 0.3 |
| identifierUUID | 1 | 5d41402abc | 5d41402abc | 0 |
| phoneBrightness | 1 | 40% | 80% | 0.5 |
| identifierAppProcessID | 1 | 4b2a76 | 4b2a76 | 0 |
| versionOS | 1 | 17.1 | 17.2 | 0.1 |
| | | | | Weighted score: 0.18 |
| dateBinding | N/A | 1 | 230 | Stale |

The weight scores can be tuned based on actual fraud detected so that over time, the features more indicative of fraud can have higher weighting over time.

In this example, the deviation score is utilized to determine whether access should be provisioned.

The approach for coordinating and determining whether an intervention should be imposed can be based on a weighted score based on a quantum of differences between the binding fingerprint and characteristics of a new transaction (e.g., the signature of the device has changed in some example, when the merchant backend or the financial institution backend receives a new transaction request along with the binding keypair (and in some embodiments the fingerprint payload), a threat decision matrix data object can be interrogated for determining whether any additional authentication steps are required. This can include a first BIN routing table, which for certain requests corresponding to different BINs can be routed differently for different threat levels, and then an approach for coordinating and determining whether an intervention should be imposed.

The range of permitted deviation scores may also be modified (e.g., expanded, contracted) in certain situations, such as where a similar product or service is being purchased by a user.

Figure 10:
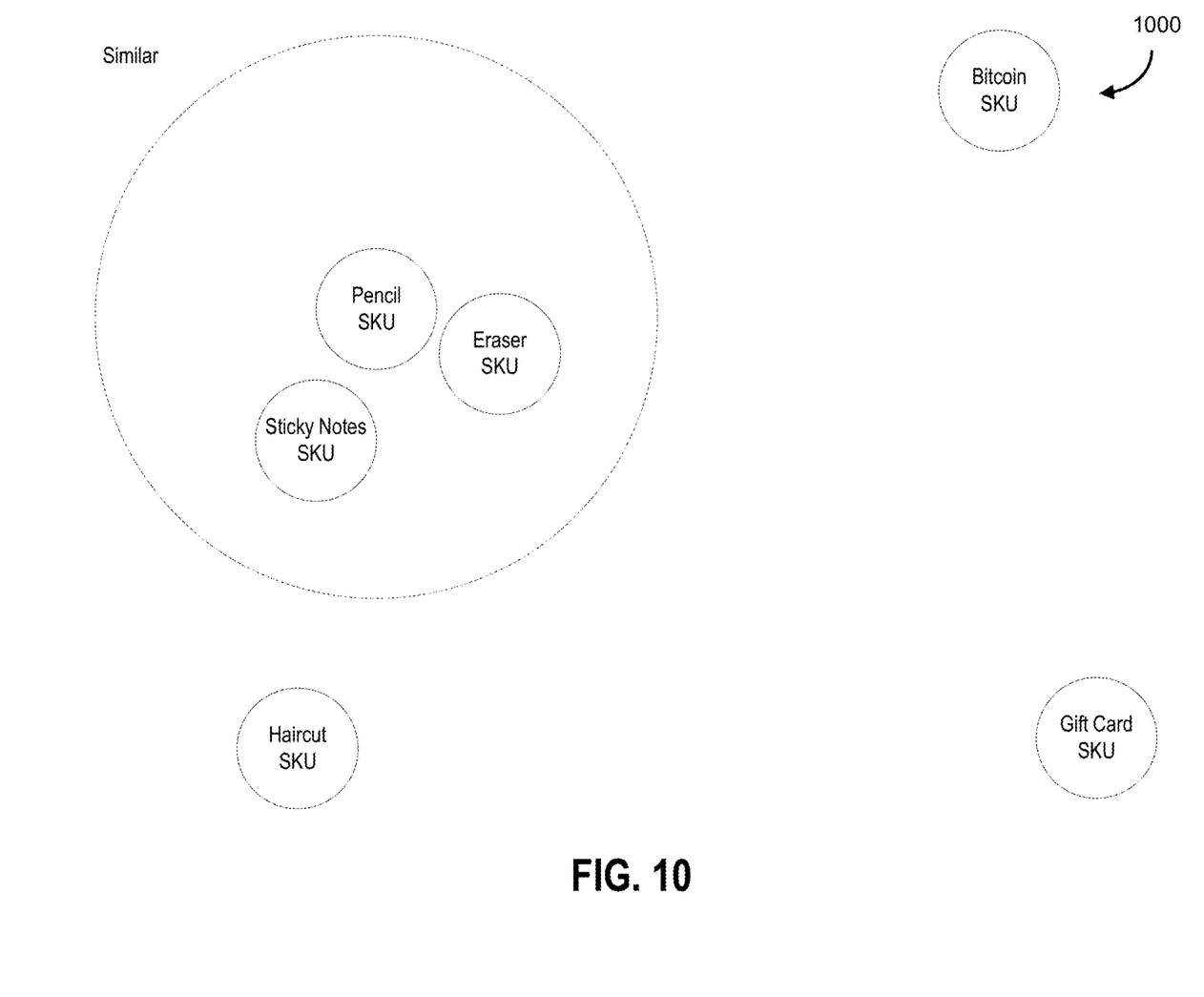
FIG. 10 is a depiction of an example graph data object that can be used for similar product or service determination, according to some embodiments.

FIG. 10 is a depiction of an example graph data object 1000 that can be used for similar product or service determination, according to some embodiments. This graph can be periodically generated based on clustering approaches, for example using different purchase data from different users, and a reference data object can be maintained with different levels of granularity. In this example, the user periodically purchases pencils, and thus a zone of similarity can be established for certain types of purchases.

These can be practically implemented using similarity matrices or scores that are associated with different product or service identifiers, such as SKU numbers, but additional granularity or complexity can be added, such as specific products being sold by specific vendors, and so forth.

In this example, because the user has bought a pencil, they are more likely to purchase erasers, sticky notes, etc. When attempting to make a purchase in having a high similarity score, in some embodiments, the acceptable range of permitted deviation scores can be expanded, as shown in the shoulder sections of FIG. 9. In a further embodiment, the zone of permitted drift may also be expanded. Accordingly, at the time of a contemporaneous transaction, this similarity matrix can be loaded to determine the range of permitted deviation scores or the zone of permitted drift dynamically. Depending on the determined deviation score, in some embodiments, if the deviation score is within the dynamically determined drift range, an automatic binding update may be invoked as part of the transaction characteristics.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

We claim:

1. A system for secure data communications for streamlined electronic transaction processing, the system comprising:

a processor coupled to computer memory and data storage, the processor configured to:

receive, from a portable device associated with a user, a device binding data object storing one or more data fields representative of characteristics of the portable device;

receive, from a first communication pathway, a web interface being accessed by the portable device, a first transaction request including at least a transaction card number;

retrieve, based on a cross-referencing of the transaction card number with unique communication identifier strings stored on the data storage, a corresponding unique communication identifier string;

control the portable device to render a first challenge interface screen utilizing at least the corresponding unique communication identifier string, and upon receiving a successful response input from the portable device to the first challenge interface screen;

process, the first transaction request using a real-time decision engine configured to automatically determine whether a step-up authentication data process is invoked based at least on the one or more fields of the device binding data object;

upon a determination that the step-up authentication data process is invoked, transmit a secure code across a second communication pathway utilizing the unique communication identifier string to the portable device;

control the portable device to render a second challenge interface screen requesting entry of the secure code into the second challenge interface screen; and upon an entry of the secure code into the second challenge interface screen, authenticate the first transaction request for downstream processing.

2. The system of claim 1, wherein the device binding data object is a signed data object token encoded by a public key of the portable device.

3. The system of claim 1, wherein a plurality of transactions are conducted, and for transactions of the plurality of transactions subsequent to a first transaction, the step-up authentication data process is not invoked.

4. The system of claim 3, wherein for the first transaction, the secure code is used to update the device binding data object such that the device binding data object is transformed into an enhanced device binding data object.

5. The system of claim 4, wherein the determination that the step-up authentication data process is invoked is based at least on the enhanced device binding data object.

6. The system of claim 1, wherein the real-time decision engine determines whether the step-up authentication data process based on which site is being accessed by the portable device.

7. The system of claim 1, wherein the device binding data object is stored on a secure memory region of the portable device.

8. The system of claim 1, wherein the device binding data object is stored on a secure memory region of a backend server device.

9. The system of claim 1, wherein the device binding data object is automatically updated without user intervention during a subsequent transaction to account for drift in one or more fields of the device binding data object.

10. The system of claim 9, wherein the drift is determined based on the device binding data object is updated to reflect a current configuration of the portable device.

11. A method for secure data communications for streamlined electronic transaction processing, the method comprising:
- receiving, from a portable device associated with a user, a device binding data object storing one or more data fields representative of characteristics of the portable device;
- receiving, from a first communication pathway, a web interface being accessed by the portable device, a first transaction request including at least a transaction card number;
- retrieving, based on a cross-referencing of the transaction card number with unique communication identifier strings stored on the data storage, a corresponding unique communication identifier string;
- controlling the portable device to render a first challenge interface screen utilizing at least the corresponding unique communication identifier string, and upon receiving a successful response input from the portable device to the first challenge interface screen;
- processing, the first transaction request using a real-time decision engine configured to automatically determine whether a step-up authentication data process is invoked based at least on the one or more fields of the device binding data object;
- upon a determination that the step-up authentication data process is invoked, transmitting a secure code across a second communication pathway utilizing the unique communication identifier string to the portable device;
- controlling the portable device to render a second challenge interface screen requesting entry of the secure code into the second challenge interface screen; and
- upon an entry of the secure code into the second challenge interface screen, authenticating the first transaction request for downstream processing.

12. The method of claim 11, wherein the device binding data object is a signed data object token encoded by a public key of the portable device.

13. The method of claim 11, wherein a plurality of transactions are conducted, and for transactions of the plurality of transactions subsequent to a first transaction, the step-up authentication data process is not invoked.

14. The method of claim 13, wherein for the first transaction, the secure code is used to update the device binding data object such that the device binding data object is transformed into an enhanced device binding data object.

15. The method of claim 14, wherein the determination that the step-up authentication data process is invoked is based at least on the enhanced device binding data object.

16. The method of claim 11, wherein the real-time decision engine determines whether the step-up authentication data process based on which site is being accessed by the portable device.

17. The method of claim 11, wherein the device binding data object is stored on a secure memory region of the portable device.

18. The method of claim 11, wherein the device binding data object is stored on a secure memory region of a backend server device.

19. The method of claim 11, wherein the device binding data object is automatically updated without user intervention during a subsequent transaction to account for drift in one or more fields of the device binding data object.

20. A non-transitory computer readable medium storing machine interpretable instructions, which when executed, cause a processor to perform a method for secure data communications for streamlined electronic transaction processing, the method comprising:
- receiving, from a portable device associated with a user, a device binding data object storing one or more data fields representative of characteristics of the portable device;
- receiving, from a first communication pathway, a web interface being accessed by the portable device, a first transaction request including at least a transaction card number;
- retrieving, based on a cross-referencing of the transaction card number with unique communication identifier strings stored on the data storage, a corresponding unique communication identifier string;
- controlling the portable device to render a first challenge interface screen utilizing at least the corresponding unique communication identifier string, and upon receiving a successful response input from the portable device to the first challenge interface screen;
- processing, the first transaction request using a real-time decision engine configured to automatically determine whether a step-up authentication data process is invoked based at least on the one or more fields of the device binding data object;
- upon a determination that the step-up authentication data process is invoked, transmitting a secure code across a second communication pathway utilizing the unique communication identifier string to the portable device;
- controlling the portable device to render a second challenge interface screen requesting entry of the secure code into the second challenge interface screen; and
- upon an entry of the secure code into the second challenge interface screen, authenticating the first transaction request for downstream processing.

* * * * *